May 4, 1937. W. C. HEDGCOCK 2,079,554
DRUM BRAKE
Filed Dec. 2, 1935 7 Sheets-Sheet 1

INVENTOR.
William C. Hedgcock
BY
ATTORNEYS.

May 4, 1937.  W. C. HEDGCOCK  2,079,554
DRUM BRAKE
Filed Dec. 2, 1935  7 Sheets-Sheet 4

INVENTOR.
William C. Hedgcock
BY
ATTORNEYS.

May 4, 1937.  W. C. HEDGCOCK  2,079,554
DRUM BRAKE
Filed Dec. 2, 1935  7 Sheets-Sheet 5

INVENTOR.
William C. Hedgcock
BY
ATTORNEYS.

May 4, 1937.  W. C. HEDGCOCK  2,079,554

DRUM BRAKE

Filed Dec. 2, 1935  7 Sheets-Sheet 6

INVENTOR.
William C. Hedgcock
BY
ATTORNEYS.

Patented May 4, 1937

2,079,554

UNITED STATES PATENT OFFICE 2,079,554

DRUM BRAKE

William C. Hedgcock, Chicago, Ill., assignor to American Steel Foundries, Chicago, Ill., a corporation of New Jersey Application December 2, 1935, Serial No. 52,454

19 Claims. (Cl. 188—58)

This invention relates generally to brake equipment for railways and more particularly to an improved form of drum brake having particular reference to the form of the braking surface of the drum itself, and arrangement of the shoes designed to cooperate therewith.

Two purposes are commonly in view when drum brakes are designed for railway equipment: The first is to remove the action of the brake shoes from the tread surface of the wheel in order to avoid damage to the wheel which results from heating frictional abrasion; the second, to provide a more effective brake than is possible by the use of brake shoes frictionally engaging the wheel tread.

One limitation on the effectiveness of the usual brake having shoes bearing against the wheel tread is the effective area of frictional contact available. The width of the brake shoe is limited to the width of the face of the wheel tread, and the length of the shoe is limited by its ability to withstand warping and breakage as well as by the means for bracing when pressed against the wheel, and by the relationship of its effective length to the diameter of the wheel as determined by practical experience. Another very important limitation upon the present standard dimensions for brake shoes, as used against the wheel tread, is the fact that during braking action high temperatures are generated, causing the shoe to warp so that a relatively small portion of the nominal area of contact is actually in frictional engagement with the wheel. Experience has shown that small shoes, or slotted shoes, maintain a larger percentage of effective area of contact than shoes having large, unbroken faces; those with smaller areas warp less, relatively speaking, and, therefore, adjust themselves to more accurate conformity with the opposed rotating braking surface, usually the wheel.

It has also been learned that the coefficient of friction decreases as the unit shoe pressure increases. Maximum braking efficiency, which requires a high coefficient of friction, will be secured only when the unit shoe pressure is kept relatively low and this, in turn, calls for a large area of brake shoe contact.

At one time single shoe brakes were the rule, but these have been largely superseded by clasp brakes, thus providing two brake shoes per wheel and halving the unit shoe pressure required in order to secure equal braking efficiency. The effective limitation of the shoe pressure may be reached even with the clasp brake, however, and where additional braking power is necessary brake drums may be made use of, thus providing a larger braking surface than would be available on the wheel tread.

On the other hand, when brake drums are mounted on the wheel axles they must obviously be of a smaller diameter than the wheel itself and, therefore, for a given braking power the total pressure of the shoe on the drum must be higher than would be the shoe pressure on the wheel tread because of the smaller moment arm provided by the drum with its lesser diameter. For this reason a larger brake shoe area is required on a drum for a brake of the same efficiency than would be required at the wheel tread. In order to make this larger area effective, a construction of the brake shoe is required which will permit it to equalize and adjust itself to the drum surface and, at the same time, will avoid excessively large area which is conducive to warpage and reduction of effective braking area. My improved brake drum and brake shoe construction is designed to meet these requirements for successful brake drum operation.

It is a well known fact that very definite space limitations are effective on present railway equipment because of numerous dimensions having heretofore been made standard as, for example, the standard gauge between tracks, standard platform heights, standard wheel diameters, standard car body heights, likewise new developments such as where conditions are constantly making increased demands for space. It is, therefore, not only desirable but absolutely necessary to conserve space to the utmost and to make the most efficient use of space available.

An object of this invention is to provide a novel design of drum brake construction for railway equipment having a larger effective braking area than has been possible in earlier designs.

Another object of my invention is to provide a drum brake having a V-shaped peripheral face against which the brake shoes may engage.

Still another object of my invention is to provide a novel form of drum brake having a peripheral groove within which a plurality of brake shoes may be fitted which, in operation, while serving to act as single shoes, have, nevertheless, the advantage of a smaller frictional area than would otherwise be possible, being, therefore, better adapted to maintain effective conformity with the drum face than would otherwise be possible.

A still further object of my invention is to design a drum brake in which relatively low unit shoe pressure will be maintained, thus avoiding the difficulties, such as warpage, which occur as a result of high temperatures and high braking pressures per unit area.

A still further object of my invention is to design a type of drum brake which will permit easy removal and application of brake shoes and in which all of the braking parts will be readily available for inspection while in operation.

Yet another object of my invention is to construct a novel design of drum brake for railway equipment in which proper alignment of the parts as, for example, the shoes in relation to the braking surface, are automatically maintained thereby preventing the difficulties often resulting from misalignment.

With these and various other objects in view, my invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1:
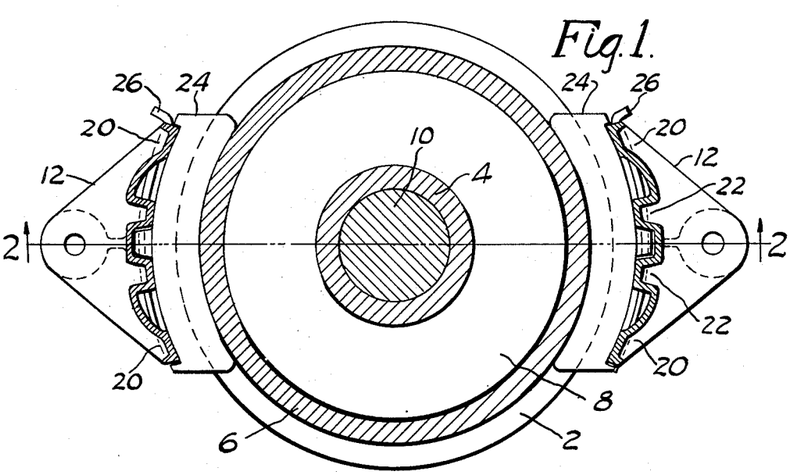
Figure 1 is a side elevation, partly in section, of a drum brake structure made in accordance with my invention, the section being taken substantially in the vertical plane indicated by the line 1—1 of Figure 2.
Figure 2:
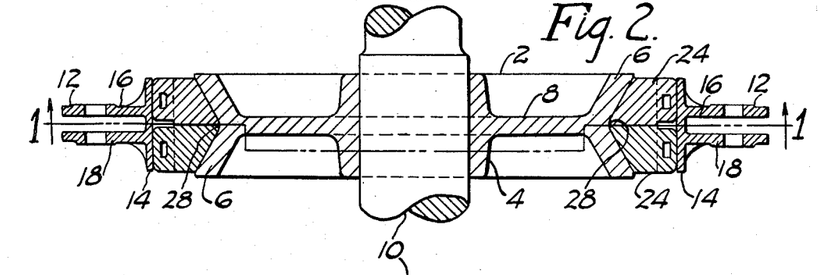
Figure 2 is a sectional view of the structure shown in Figure 1, the section being taken substantially in the horizontal plane indicated by the line 2—2 of Figure 1, the associated axle being shown in elevation.
Figure 3:
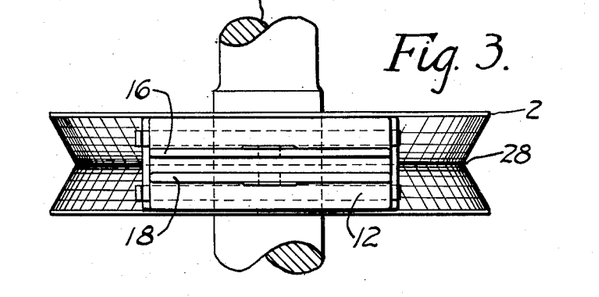
Figure 3 is a view in end elevation of the structure shown in Figure 1.

Referring more particularly to the structures shown in detail in Figures 1 to 3, the brake drum 2 may consist generally of a hub portion 4 and a peripheral portion 6 integrally connected by the plate portion 8. The drum 2 is shown mounted upon the axle 10 upon which it may be secured as by a press fit or any other convenient manner. The brake head 12, which may be mounted as hereinafter described or in any convenient manner, conforms generally to the shapes commonly used and may consist of the front wall 14 conforming in general contour to the perimeter of the drum and having the integral, vertical, reinforcing flange portions 16 and 18. Upon the inner faces of the wall portion 14 may be integrally formed top and bottom toe lugs 20—20 and likewise, the integrally formed, intermediate lugs 22—22, all of said lugs being designed for cooperative engagement with the associated brake shoes 24, the brake shoes being secured to the brake head in the usual manner, by means of the keys 26.

It will be observed that the brake shoes 24—24, which may be interchangeable, operate in pair as a single unit, but with the advantage that the frictional area of each is only half that otherwise required for a single shoe. They are, therefore, better adapted to maintain effective conformity with the drum face than would be possible with a single shoe. Each brake shoe 24 is asymmetrically formed having its rear face designed to engage with one half of the associated brake head in a manner similar to that commonly used and as previously described, and having its front face arranged at a diagonal to a vertical plane bisecting the brake drum and concentrically arranged with one half of the peripheral face of the associated drum, thus the two brake shoes 24 are associated with a single brake head 12 and act as a unit within the peripheral V-shaped groove 28 which forms the braking surface of the perimeter of the brake drum.

It will be observed, therefore, that each shoe 24, being thus provided with an angularly disposed braking surface engaging one half of the V-shaped groove 28, will be forced into tight engagement with the opposed braking face of the drum and, at the same time, forced into lateral engagement with the adjacent brake shoe and thereby the two brake shoes will act as a unit in the V-shaped periphery of the drum. This eliminates the tendency which is common for the brake shoe to run off of the braking surface it engages. In addition, the V-shaped drum face in cooperation with the corresponding angular faces of the brake shoes position the brake rigging in proper alignment with the center of the brake drum and resists any tendency for lateral displacement of the brake rigging. The required unit pressure may be steadily maintained, therefore, on the braking surfaces without any tendency for the brakes to become misaligned. Moreover, the wedging action, which results with the angular faces of the brake shoes just described, provides a higher resultant pressure on the braking surfaces than would be obtained for a given pressure at the brake head if a flat cylindrical braking surface were used. Moreover, the lateral width through the V-shaped groove is greater and the area of contact is thus increased for receiving these greater pressures.

For these reasons and for the reasons hereinbefore mentioned, this form of brake drum will provide a more efficient brake than would be obtainable with the conventional cylindrical brake drum. While it has the additional advantage of maintaining the proper alignment of the braking parts, at the same time it permits easy replacement of the brake shoes.

As will be observed, in each embodiment of my invention I have shown only a fragment of the truck structure. In each case the structure at the opposite side of the truck is similar to that actually shown. It is believed that this form of drawing simplifies the necessary description and offers a better understanding of the invention.

Figure 4:
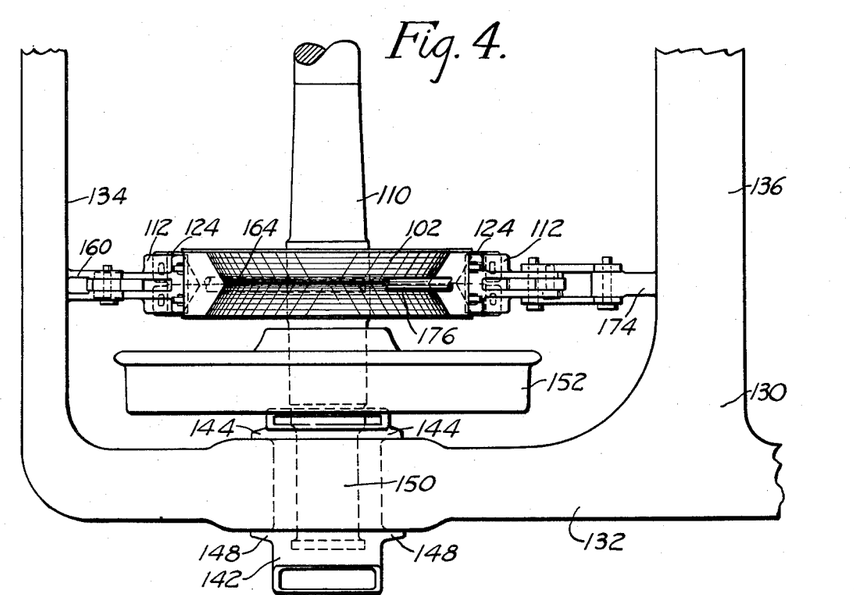
Figure 4 is a fragmentary top plan view of a railway car truck embodying my invention, wherein the brake drum is mounted inwardly of the wheel.
Figure 5:
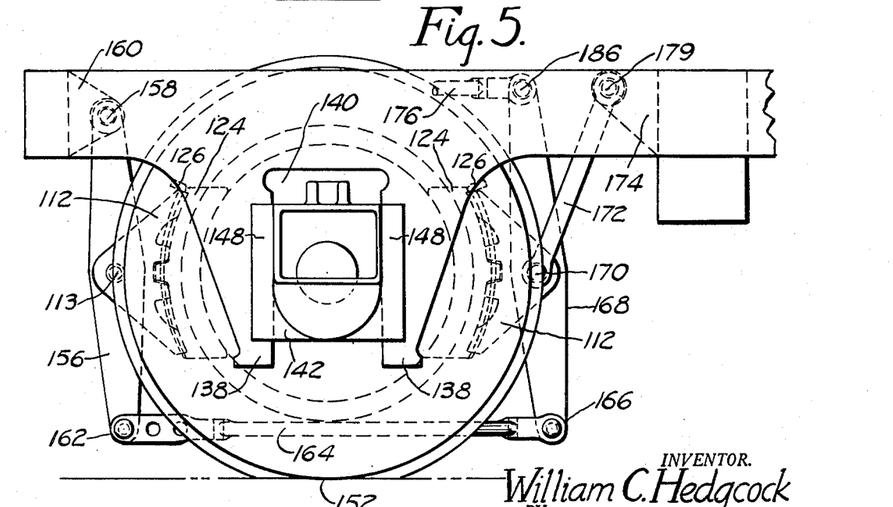
Figure 5 is a side elevation of the truck and brake construction shown in Figure 4.

I will refer now more particularly to the structures shown in Figures 4 and 5, showing a drum brake having details of the brake drum and the associated brake heads and shoes identical with the structures just described in Figures 1, 2 and 3.

In this construction I have shown a truck having the axle journals outboard the wheels, the brake drum inwardly of the wheels and brakes of the hanger type. The truck frame 130 is of a well known type having the side frame 132, the end rail 134 and the cross member 136; the side frame is provided with pedestal jaws 138 forming the pedestal opening 140, within which is received the journal box 142 in the usual manner. The journal box is shown provided with the inner retaining flanges 144 and the outer retaining flanges 148, and is associated in the usual manner with the journal end 150 of the axle 110 of the wheel and axle assembly 152. The drum 102 is mounted as by a press fit, or other convenient means, upon the axle 110 just inwardly of the wheel 154 and rotates with the wheel and axle assembly. As viewed in Figure 5, the brake head 112, at the left of the assembly, has the associated brake shoes 124 secured thereto through the usual key connection 126 and is pivotally connected as at 113 to the dead lever 156, the upper end of which is fulcrumed as at 158 by means of the bracket 160 to the end rail 134 of the truck frame 130. The lower end of the dead lever 156 is pivotally and adjustably connected as at 162 to the pull rod 164, said rod being pivotally connected at its opposite end as at 166 to the live lever 168, said live lever being swingingly and pivotally connected as at 170 to the hanger 172 which, in turn, is pivotally supported as at 179 to the bracket 174, which is integrally formed on the cross member 136 of the truck frame 130. As viewed at the right of Figure 5, the brake head 112, carrying the brake shoes 124 by means of the usual key connection 126, is pivotally supported on the live lever 168 as at 170. The upper end of the live lever 168 may be connected as at 186 by means of the pull rod 176 to any convenient form of operating means as, for example, a pressure cylinder (not shown) supported either on the truck frame or on the car body.

In operation, actuation of the power means will cause the pull rod 176 to be moved to the left as viewed in Figure 5, causing the live lever 168 to move in a counter-clockwise direction about the pivot point 166, causing the brake shoe at the right to bear upon the associated periphery of the brake drum 102. Further movement of the pull rod 176 will cause the live lever 168 to pivot in a counter-clockwise direction about the point 170, thus moving the pull rod 164 to the right and causing the dead lever 156 to move in a counter-clockwise direction about the pivot point 158, thus bringing the brake shoes at the left into contact with the associated periphery of the brake drum 102. Release of the power means will move the pull rod 176 to the right thus releasing the brakes.

Figure 6:
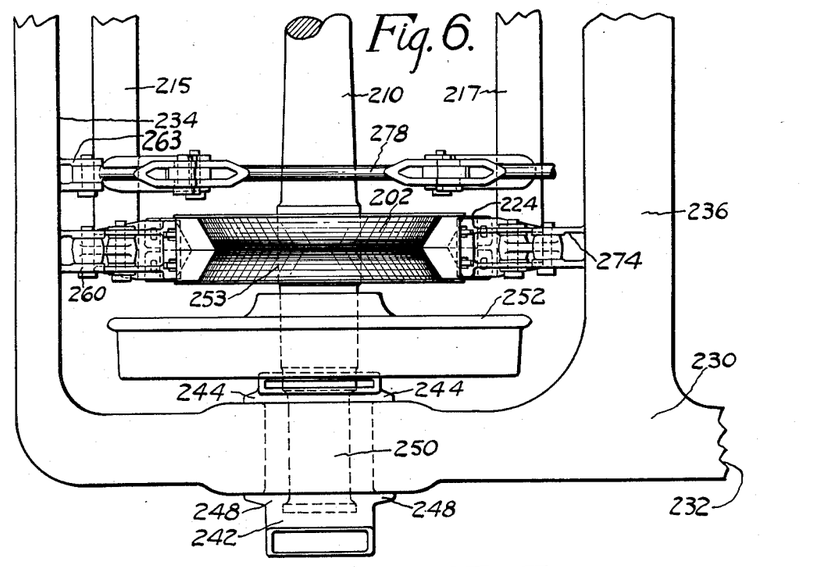
Figure 6 is a fragmentary top plan view of another truck construction embodying my invention, in which the brake drums are also mounted inwardly of the wheel.
Figure 7:
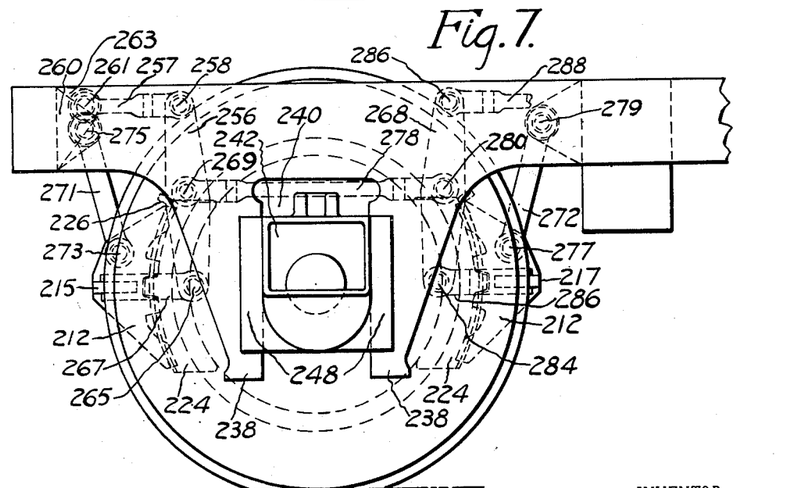
Figure 7 is a side elevation of the truck construction shown in Figure 6.

In the truck and brake arrangement shown in Figures 6 and 7 I have shown a structure in which the journals are located outwardly of the wheels, the brake drum inwardly of the wheels associated with brakes of the beam type.

The truck frame 230 has the usual side frames 232 connected by end rails 234 and cross member 236. The side frame has the usual pedestals 238 forming the pedestal opening 240 within which is received the journal box 242 which is maintained in cooperative relation therewith by means of the inner flanges 244 and the outer flanges 248 integrally formed on the journal box. The journal portion 250 of the axle 210 of the wheel and axle assembly 252 is associated with the journal box 242 in the usual manner.

The brake drum 202 is mounted upon the axle 210 just inwardly of the wheel as at 253 by means of a press fit or in any other convenient manner. It will be observed that the diameter of the axle 210 at 253 is somewhat larger than its diameter at the point where the wheel is mounted.

The drum 202 together with the associated brake head 212 and the shoes 224, connected to the heads by the usual pins 226, are substantially of the construction previously described for Figures 1 to 3. In this case, however, the brake heads 212 are mounted upon the brake beams 215 and 217 located respectively outwardly and inwardly of the wheel and axle assembly. The outward brake beam 215 and the associated brake head is supported by the hanger 271 pivotally connected at its lower end as at 273 to the brake head 212 and pivotally connected at its upper end as at 275 to the bracket 260 integrally formed on the end rail 234. Likewise, the brake beam 217 inwardly of the wheel is supported by the hanger 272 which is pivotally connected at its lower end as at 277 to the brake head 212 and is pivotally supported at its upper end as at 279 to the bracket 274 integrally formed on the cross member 236. The dead lever 256 is pivotally connected as at 258 to the link 259 which, in turn, is pivotally connected as at 261 to the bracket 263 integrally formed on the end rail 234. The lower end of the dead lever 256 is pivotally connected as at 265 to the fulcrum 267 of the brake beam 215. The dead lever 256 is pivotally connected at an intermediate point as at 269 to the intermediate rod 278, the opposite end of said rod 278 being pivotally connected as at 280 to an intermediate point of the live lever 268. The lower end of the live lever 268 is pivotally connected as at 284 to the fulcrum 286 formed on the brake beam 217. The upper end of the live lever 268 is pivotally connected as at 286 to the pull rod 288 which may be actuated by any convenient power means (not shown).

In operation, actuation of the power means will move the pull rod 288 to the right as viewed in Figure 7 causing the live lever 268 to rotate in a clockwise direction about the pivot point 280, thus causing the brake beam 217 to move to the left and bringing the brake shoes mounted thereon into bearing against the associated periphery of the brake drum 202. Further movement of the pull rod 288 will cause the live lever 268 to pivot in a clockwise direction about the pivot point 284, thus moving the intermediate rod 278 to the right and turning the dead lever 256 in a counterclockwise direction about the pivot point 258, thus moving the brake beam 215 to the right and bringing the brake shoes 224 mounted thereon into bearing against the associated periphery of the drum 202. Release of the power means will cause the parts to move in a reverse direction, thus releasing the brakes.

Figure 8:
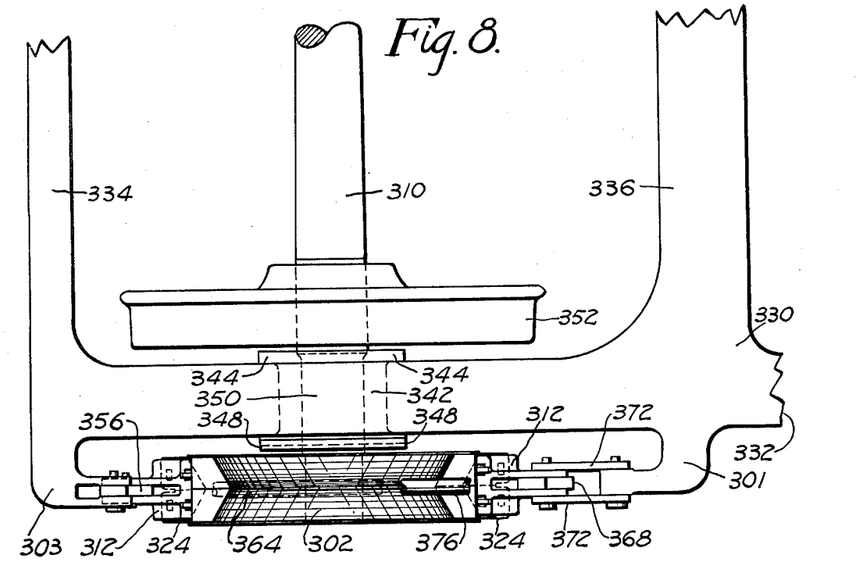
Figure 8 is a fragmentary top plan view of still another truck construction embodying my invention, wherein the brake drum is mounted outwardly of the wheel.
Figure 9:
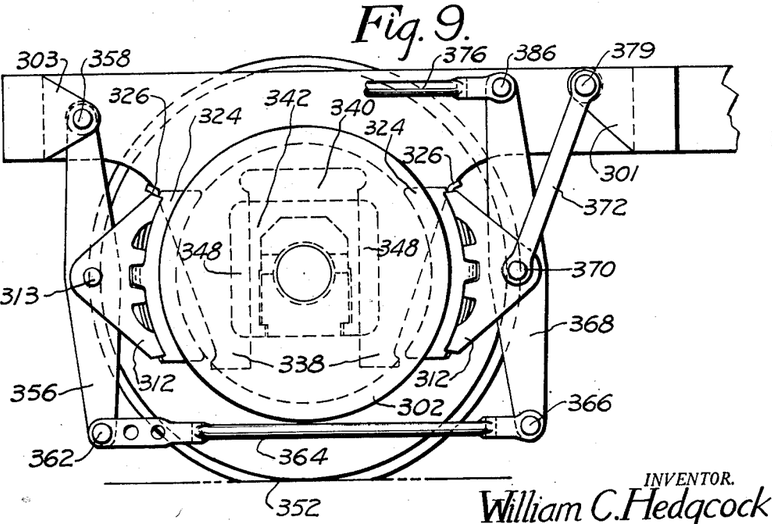
Figure 9 is a side elevation of the truck construction shown in Figure 8.

In the embodiment of my invention showing Figures 8 and 9, I have shown a truck having outboard journals, a brake drum mounted exteriorly of the wheels and brakes of the hanger type. It will be observed that this arrangement of parts necessitates a special design of frame.

The truck frame 330 has the usual side frames 332 connected by the end rails 334 and the cross members 336. The side frame 332 has the usual pedestals 338 forming the pedestal opening 340 within which is received the journal box 342 which has the inner guide flanges 344 and the outer guide flanges 348, associated with the pedestals 338 in the usual manner. Within the journal box may be received the journal portion 350 of the axle 310 forming a part of the wheel and axle assembly 352; the brake drum 302 is mounted on the axle 310 by press fit, or other convenient manner, exteriorly of the journal portion 350. The brake drum 302 and the associated brake heads 312 and brake shoes 324 are of the structure previously described for Figures 1 to 3, the brake shoes 324 being secured to the brake head by the usual keys 326.

In this modification of my invention, the side frame 332 has integrally formed brackets 301 and 303 from which the brake rigging may be supported in the manner to be described. The dead lever 356 is pivotally supported at its upper end as at 358 from the bracket 303 and at an intermediate point as at 313 pivotally supports the brake head 312 and its associated brake shoes 324. The lower end of the dead lever 356 is pivotally and adjustably connected as at 362 to the pull rod 364, the other end of said pull rod being pivotally connected as at 366 to the live lever 368 which is swingably and pivotally supported from an intermediate point as at 370 by means of the hangers 372, the hangers being pivotally supported as at 379 from the bracket 301. The upper end of the live lever 368 may be pivotally connected as at 386 to the pull rod 376 which may be actuated by any convenient form of power operating mechanism such as a brake cylinder (not shown).

In operation, actuation of the power means will cause movement to the left of the pull rod 376, as viewed in Figure 9, the live lever 368 will be thereby rotated in a counter-clockwise direction about the pivot point 366 bringing the brake head and associated brake shoes, carried by the live lever 368, into engagement with the associated periphery of the drum 302. Further movement of the pull rod 376 will rotate the live lever 368 in a counter-clockwise direction about the pivot point 370, thus moving the pull rod 364 to the right and causing the dead lever 356 to rotate in a counter-clockwise direction about the pivot point 358, thus bringing the brake head and associated shoes, carried by the dead lever 356 into bearing against the opposite side of the drum 302. Release of the power means will cause the reverse action of the various parts, thus releasing the brakes.

Figure 10:
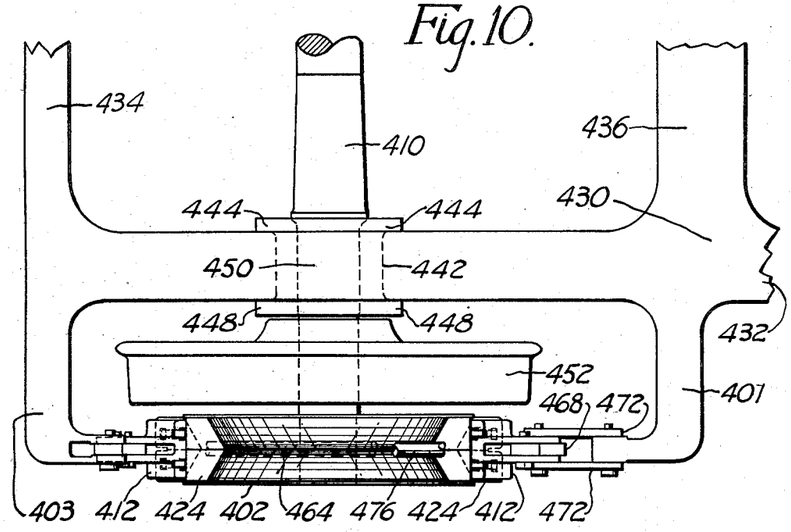
Figure 10 is a fragmentary top plan view of still another truck construction embodying my invention, wherein also the brake drum is mounted exteriorly of the wheel.
Figure 11:
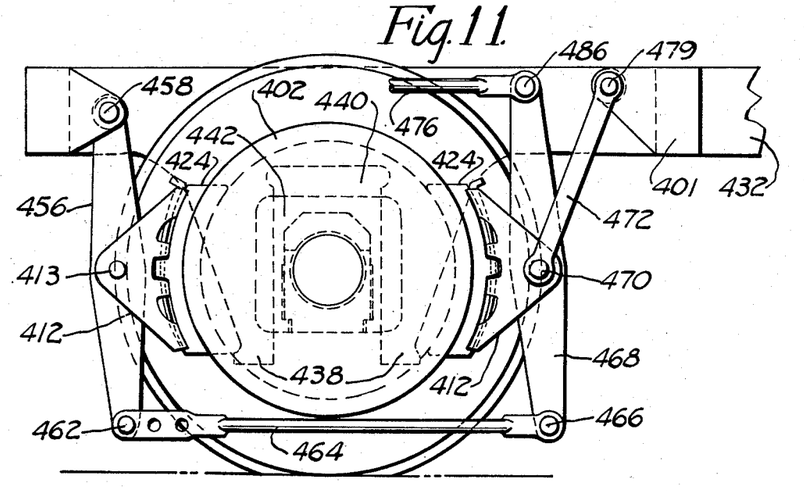
Figure 11 is a side elevation of the structure shown in Figure 10.

In the modification of my invention shown in Figures 10 and 11, I have designed a truck having inboard journal bearings and drum brakes mounted exteriorly of the wheels. The truck frame 430 has the side frames 432 integrally joined by the end rails 434 and the cross members 436. The side frame has the pedestals 438 forming the pedestal opening 440 within which is received the journal box 442 having the inner guide flanges 444 and the outer guide flanges 448 for maintaining the journal box in proper relationship to the side frame. Within the journal box 442 is received the journal portion 450 of the axle 410 forming a part of the wheel and axle assembly 452. The laterally extending brackets 401 and 403, integrally formed on the side frames, provide supporting means for the brake rigging in the manner to be described.

The brake drum 402, the brake heads 412 and the associated brake shoes 424 are of the form previously described for Figures 1 to 3. The dead lever 456 is pivotally supported at its upper end as at 458 from the bracket 403 and has mounted thereon at an intermediate point as at 413 the brake head 412 with its associated brake shoes. The lower end of the dead lever 456 is pivotally and adjustably connected as at 462 to the pull rod 464, said pull rod being pivotally connected at its opposite end as at 466 to the lower end of the live lever 468 which is swingingly and pivotally supported at an intermediate point as at 470 by the hangers 472; the upper ends of the hangers 472 are pivotally connected as at 479 to the bracket 401. The brake head 412 and its associated brake shoes are likewise pivotally mounted on the live lever 468 at the intermediate point 470. To the live lever 468 may be pivotally secured as at 486 the pull rod 476 which may be operatively connected to any convenient power means as, for example, a brake cylinder.

In operation, actuation of the power means will cause the pull rod 476 to move to the left as viewed in Figure 11, thus rotating the live lever 468 in a counter-clockwise direction about the pivot point 466, thus bringing into bearing against the associated periphery of the brake drum the brake shoes, mounted on the brake head and carried by the live lever 468. Further movement of the pull rod 476 causes rotation of the live lever 468 in a counter-clockwise direction about the pivot point 470, thus causing the pull rod 464 to move to the right and rotate the dead lever 456 in a counter-clockwise direction about the pivot point 458 and bringing the brake shoes, mounted on the brake head and carried by the dead lever 456 into bearing against the opposite side of the drum 402.

Figure 12:
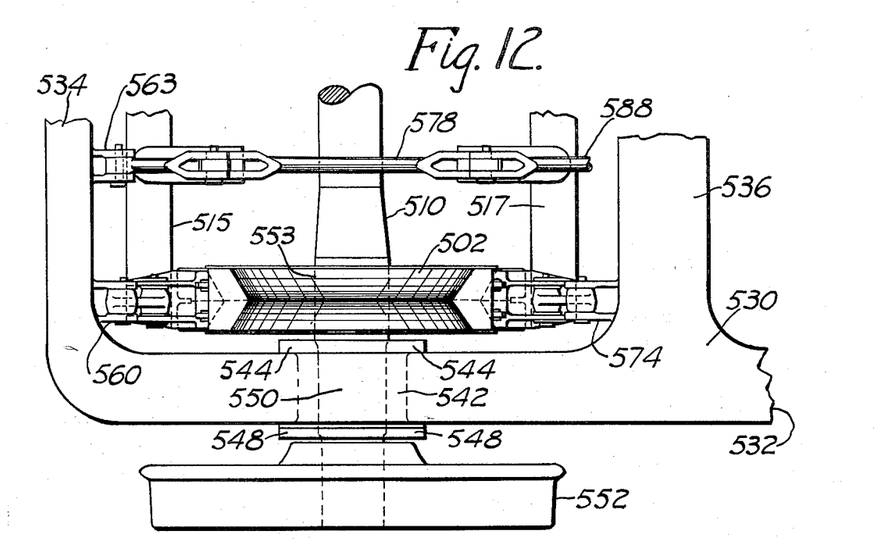
Figure 12 is a fragmentary top plan view of yet another truck construction embodying my invention, wherein also the brake drum is mounted inwardly of the wheel.
Figure 13:
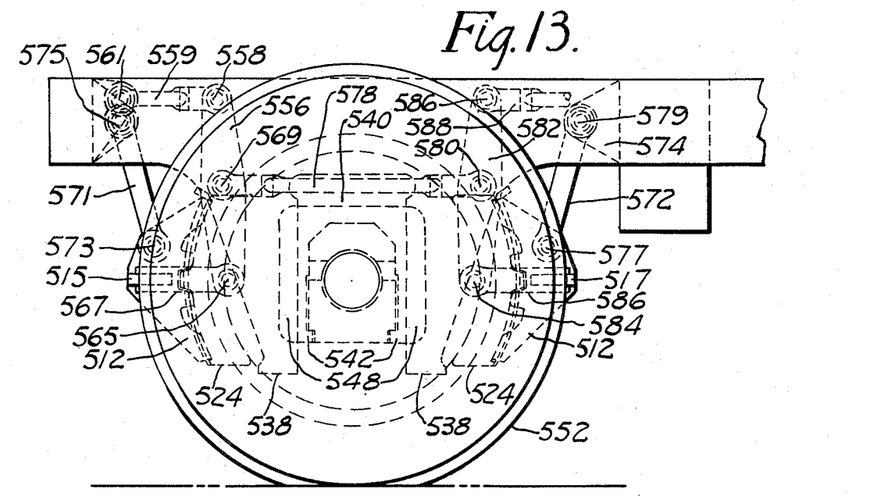
Figure 13 is a side elevation of the truck construction shown in Figure 12.

In the embodiment of my invention disclosed in Figures 12 and 13, I have devised a truck having inboard journal bearings and a drum brake mounted inwardly of the journal bearings with associated brake rigging of the beam type. The truck frame 530 has the side frames 532 joined by the end rails 534 and the cross members 536. The side frames have the pedestals 538 forming the pedestal opening 540 within which may be received the journal box 542 in the usual manner. The journal box has the inner guide flanges 544 and the outer guide flanges 548 for maintaining it in proper relationship with the side frame. Within the journal box 542 may be received the journal portion 550 of the axle 510 forming a part of the wheel and axle assembly 552. The drum 502 and the associated brake heads 512 and brake shoes 524 are of the type previously described for Figures 1 to 3. The drum 502 is mounted by a press fit, or other convenient means, as at 553 on the axle 510. As viewed at the left of Figure 13 the brake heads 512 are mounted upon the brake beams 515 and the beam and its associated heads are supported as at 573 by a pivotal connection between the brake heads and the hangers 571. The upper ends of the hangers 571 are pivotally connected as at 575 to the brackets 560 integrally formed on the end rails 534. Likewise, as viewed at the right of Figure 13, the brake heads 512, mounted upon the beam 517, are pivotally supported as at 577 by the hangers 572 whose upper ends are pivotally connected as at 579 to the brackets 574 integrally formed on the cross member 536. The dead lever 556 is pivotally connected at its upper end as at 558 to the link 559 which, in turn, is pivotally connected as at 561 to the bracket 563 integrally formed on the end rail 534. The lower end of the dead lever 556 is pivotally connected as at 565 to the fulcrum 567 formed on the beam 515. The intermediate rod 578 is connected at one end to an intermediate point of the dead lever 556 as at 569, the opposite end of the said rod is connected as at 580 to a point intermediate the ends of the live lever 582. The lower end of the live lever 582 is pivotally connected as at 584 to the fulcrum 586 formed on the brake beam 517. The upper end of the live lever 582 is pivotally connected as at 586 to a pull rod 588 which may be actuated by any convenient power means as a brake cylinder.

In operation, actuation of the power means will move the pull rod 588 to the right as viewed in Figure 13, thus rotating the live lever 582 in a clockwise direction about the pivot 580, thus moving the brake beam 517 to the left and bringing the brake heads 512 and the associated brake shoes 524, carried by the beam 517 into engagement with the associated periphery of the brake drum 502. Further movement of the pull rod 588 will operate the live lever 582 about the pivot point 584 in a clockwise direction, thus moving the intermediate rod 578 to the right and rotating the dead lever 556 in a counter-clockwise direction about the pivot point 558, thus moving the brake beam 515 to the right and bringing the brake shoes 512 and the associated brake heads 524 into operative engagement against the opposite side of the periphery of the drum 502. Release of the actuating means will operate the various levers in the opposite direction, thus releasing the brakes.

Figure 14:
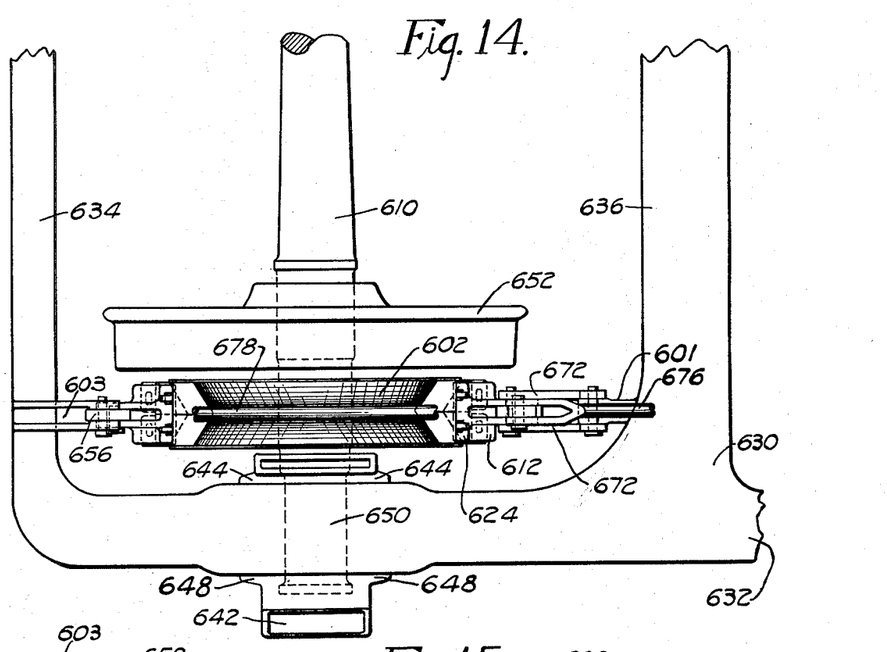
Figure 14 is a fragmentary top plan view of yet another truck construction embodying my invention and wherein the brake drum is mounted exteriorly of the wheel.
Figure 15:
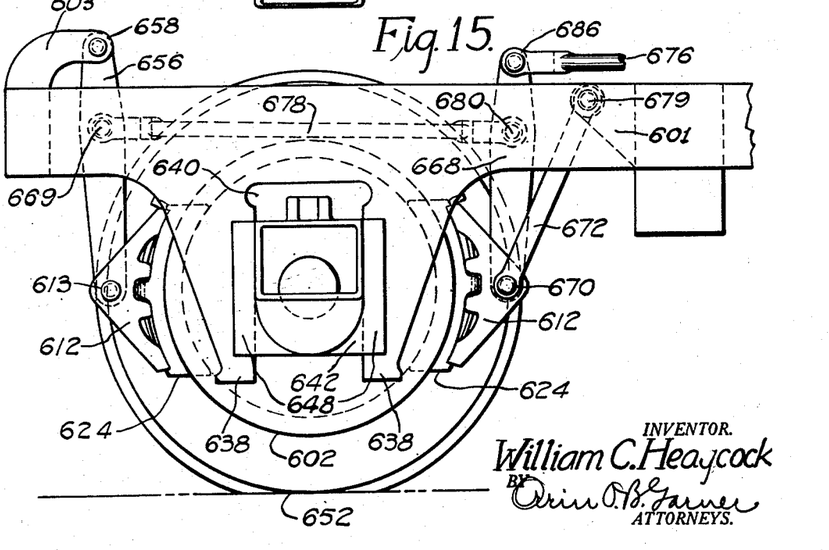
Figure 15 is a side elevation of the truck construction shown in Figure 14.

In the final embodiment of my invention, Figures 14 and 15, I have provided a truck of the outboard type having my novel brake drum mounted exteriorly of the wheels and inwardly of the journal bearing. In this construction, the truck frame 630 has the side frames 632 joined by the end rails 634 and the cross members 636. The pedestals 638 on the side frame 632 form the pedestal opening 640 within which is received the journal box 642 having the inner guide flanges 644 and the outer guide flanges 648 for maintaining proper assembly between the side frame and the journal box. The journal box forms a housing for the journal portion 650 of the axle 610 forming a part of the wheel and axle assembly 652. The brake drum 602 is mounted upon the axle 610 by a press fit, or other convenient means, between the journal portion 650 and the adjacent wheel. In this construction the form of the brake drum 602 and the associated brake heads 612 and brake shoes 624 are of the type previously described in Figures 1 to 3.

In this modification, I have provided brake rigging of the hanger type supported from the truck structure by the brackets 601 and 603, integrally formed, respectively, on the cross member 636 and the end rail 634 of the truck frame. The dead lever 656 is pivotally supported at its upper end as at 658 from the bracket 603. The lower end of the dead lever 656 pivotally supports the brake head 612 and the associated brake shoes 624 as at the pivot point 613. The intermediate rod 678 is pivotally connected as at 669 to an intermediate point of the dead lever 656 and the opposite end of the intermediate rod 678 is pivotally connected as at 680 to an intermediate point on the live lever 668. The upper end of the live lever 668 is pivotally connected as at 686 to the pull rod 676 which may be actuated by any convenient power means, such as a brake cylinder. To the lower end of the live lever 668 is pivotally connected as at 670 the brake head 612 which carries the brake shoes 624. The lower ends of the hangers 672 are also connected at the pivot point 670 and the upper ends of the hangers 672 are pivotally supported as at 679 from the bracket 601, thus providing support for the brake rigging at that point.

In operation, actuation of the power means will move the pull rod 676 to the right as viewed in Figure 15, thus rotating the live lever 668 in a clockwise direction about the pivot point 680 and bringing the associated brake head 612 and brake shoes 624 into bearing against the associated peripheral surface of the brake drum 602. Further movement of the pull rod 676 will cause clockwise rotation of the live lever 668 about the pivot point 670, thus moving to the right the intermediate rods 678 and rotating the dead lever 656 in a counter-clockwise direction about the pivot point 658, thus moving the associated brake head 612 to the right and bringing the brake shoes 624 into operative engagement against the opposite side of the brake drum 602. Release of the actuating means will cause movement of the various levers in the opposite direction, thus releasing the brakes.

It is to be understood that I do not wish to be limited by the exact embodiments of the device shown, which are merely by way of illustration and not limitation, as various and other forms of the device will, of course, be apparent to those skilled in the art without departing from the spirit of the invention or the scope of the claims.

I claim:

1. The combination of a brake drum having a V-shaped periphery, brake heads disposed at opposite sides of said drum, and a pair of shoes mounted on each of said brake heads, each of said brake shoes having lateral engagement with an associated brake shoe and having a diagonal face engagement with one side of said V-shaped periphery.

2. In a railway brake rigging the combination of a brake drum having a V-shaped peripheral groove, brake heads mounted at opposite sides of said drum, and a pair of brake shoes mounted on each brake head, the brake shoes of each pair having lateral engagement with each other and face engagement with opposed portions of said V-shaped groove.

3. In a railway brake rigging the combination of a brake drum having a V-shaped peripheral groove, brake heads mounted at opposite sides of said drum, and a pair of brake shoes mounted on each of said brake heads, each shoe of said pair being asymmetrical in form and complemental with the other shoe of said pair, the said shoes of each pair having lateral engagement with each other and diagonal face engagement with opposite portions of said V-shaped groove.

4. In a railway brake rigging the combination of a brake drum having a V-shaped peripheral groove, a brake head mounted adjacent said drum, and a plurality of brake shoes mounted on said brake head, each of said brake shoes being asymmetrical in form and complemental to an adjacent shoe, said brake shoes having lateral engagement with each other and diagonal face engagement with portions of said V-shaped groove.

5. In a railway brake rigging the combination of a brake drum having a peripheral groove, brake heads mounted at opposite sides of said brake drum, and a plurality of brake shoes carried by each of said brake heads, each of said brake shoes being of asymmetrical form and complemental to an adjacent shoe.

6. In a brake rigging the combination of a brake drum having a peripheral groove, brake heads mounted at opposite sides of said drum, and a pair of brake shoes mounted on each brake head, the shoes of each pair being asymmetrical in form and complemental to each other whereby one shoe of each pair has face engagement with one-half of said peripheral groove and the other shoe of each pair has face engagement with the opposed half of said peripheral groove.

7. In a brake rigging the combination of a brake drum having a peripheral groove, a brake head supported adjacent said drum, and a pair of brake shoes mounted on said brake head and having lateral engagement with each other, said brake shoes being asymmetrical in form and complemental to each other whereby one shoe of each pair has face engagement with one half of said peripheral groove and the other shoe of each pair has face engagement with the opposed half of said peripheral groove.

8. In a brake rigging the combination of a brake drum having a V-shaped peripheral groove and brake heads mounted at opposite sides of said drum, a pair of brake shoes mounted on each of said heads, the shoes of each pair being asymmetrical in form and complemental to each other whereby said shoes have face engagement with opposed portions of said V-shaped groove.

9. In a brake rigging the combination of a brake head and a pair of brake shoes mounted on said brake head, each of said brake shoes being of asymmetrical form and complemental to the other shoe of said pair.

10. In a brake rigging the combination of a brake head and a pair of brake shoes mounted on said brake head, each of said brake shoes being asymmetrical in form and having a diagonal face complemental in form to its adjacent shoe whereby the shoes of each pair act as a unit against a braking surface.

11. In brake rigging the combination of a V-shaped braking surface, a brake head mounted adjacent said surface, and a pair of brake shoes mounted on said brake head, each of said brake shoes having lateral engagement with the other shoe and diagonal face engagement with said V-shaped surface.

12. In a brake rigging the combination of a V-shaped braking surface, a brake head mounted adjacent said surface, and a pair of brake shoes mounted on said brake head, each of said brake shoes having a form asymmetrical and opposite to that of its adjacent shoe whereby said shoes act as a unit against said braking surface.

13. In a brake rigging the combination of a brake head and a pair of brake shoes mounted on said head, said brake shoes having lateral engagement with each other and diagonal faces of opposite inclination whereby said shoes act as a wedge-like unit against a complementary braking surface.

14. In a brake rigging the combination of a brake head and a pair of brake shoes mounted on said head, each of said brake shoes being asymmetrical in form and presenting a diagonal braking surface opposite in form to that of its mate, whereby said shoes act as a wedge-like unit against a complementary braking surface.

15. In a railway brake rigging the combination of a brake drum having a V-shaped peripheral groove, a brake head supported adjacent said groove, and a pair of brake shoes mounted on said brake head, each shoe of each pair having lateral engagement with the other shoe of said pair and diagonal face engagement with one-half of said groove, whereby said shoes act as a wedge-like unit within said groove.

16. In a railway brake rigging the combination of a brake drum having a peripheral braking surface, brake heads mounted on opposite sides of said peripheral surface, and a pair of brake shoes mounted on each of said heads, each shoe of each pair having an asymmetrical form opposite in shape to that of its mate, said shoes acting as a unit against said braking surface.

17. In a brake rigging the combination of a V-shaped peripheral braking surface and a pair of brake shoes, each of said shoes having lateral engagement with its mate and diagonal face engagement with one portion of said surface.

18. In a brake rigging the combination of a V-shaped peripheral braking surface and a pair of brake shoes, said shoes having lateral engagement with each other and diagonal face engagement with said surface.

19. In a brake rigging the combination of a V-shaped peripheral braking surface and a pair of brake shoes, said shoes having lateral engagement with each other and diagonal face engagement with opposed portions of said surface.

WILLIAM C. HEDGCOCK.